United States Patent
Satz

(10) Patent No.: US 6,649,257 B1
(45) Date of Patent: Nov. 18, 2003

(54) COMPOSITE MATERIALS WITH BULK DECORATIVE FEATURES AND PROCESS FOR PRODUCING SAME

(75) Inventor: Richard Satz, South Orange, NJ (US)

(73) Assignee: Ronald Mark Associates, Inc., Hillside, NJ (US)

( * ) Notice: Subject to any disclaimer, the term of this patent is extended or adjusted under 35 U.S.C. 154(b) by 0 days.

(21) Appl. No.: 09/644,883

(22) Filed: Aug. 23, 2000

Related U.S. Application Data

(63) Continuation-in-part of application No. 09/276,996, filed on Mar. 26, 1999, now abandoned.

(51) Int. Cl.[7] ................................................. B32B 5/16
(52) U.S. Cl. .................. 428/323; 428/206; 428/320.2; 428/327; 428/363; 428/339
(58) Field of Search ................................ 428/172, 323, 428/159, 208, 320.2, 206, 324, 363, 327, 403, 339, 346, 328, 331; 52/445

(56) References Cited

U.S. PATENT DOCUMENTS

| | | | | |
|---|---|---|---|---|
| 3,267,187 | A | 8/1966 | Slosberg et al. | 264/122 |
| 3,527,146 | A | 9/1970 | Garling | 94/5 |
| 3,928,706 | A | 12/1975 | Gibbons | 428/323 |
| 3,941,607 | A | 3/1976 | Schuhbauer | 106/281 R |
| 3,991,006 | A | 11/1976 | Chandler | 260/40 R |
| 4,126,727 | A | 11/1978 | Kaminski | 428/172 |
| 4,196,243 | A | 4/1980 | Sachs et al. | 428/147 |
| 4,239,797 | A | 12/1980 | Sachs | 428/327 |
| 4,405,657 | A | 9/1983 | Miller et al. | 428/54.1 |
| 4,456,643 | A | 6/1984 | Colyer | 428/156 |
| 4,501,783 | A | 2/1985 | Hiragami et al. | 428/147 |
| 4,530,856 | A | 7/1985 | Kauffman et al. | 427/197 |
| 4,584,209 | A | 4/1986 | Harrison | 427/201 |
| 4,599,264 | A | 7/1986 | Kauffman et al. | 427/264 |
| 4,760,103 | A | 7/1988 | Kraft et al. | 523/150 |
| 4,797,314 | A | 1/1989 | Dovey et al. | 428/167 |
| 4,816,319 | A | 3/1989 | Dees et al. | 428/167 |
| 4,879,143 | A | 11/1989 | Raua | 427/387 |
| 5,017,632 | A | 5/1991 | Bredow et al. | 523/400 |
| 5,178,912 | A | 1/1993 | Piacente et al. | 427/278 |
| 5,230,945 | A | 7/1993 | Dees et al. | 428/195 |
| 5,431,960 | A | 7/1995 | Wattc | 427/359 |
| 5,445,880 | A | 8/1995 | Martiny | 428/323 |
| 5,506,030 | A | 4/1996 | Lauders et al. | 428/143 |
| 5,536,530 | A | 7/1996 | Lauders et al. | 427/197 |
| 5,571,588 | A | 11/1996 | Luss et al. | 428/46 |
| 5,627,231 | A | 5/1997 | Shalov et al. | 524/523 |
| 5,686,507 | A | 11/1997 | Hermile et al. | 523/153 |
| 5,787,655 | A | 8/1998 | Saylor | 52/181 |
| 5,789,032 | A * | 8/1998 | Le Cong et al. | 427/346 |

FOREIGN PATENT DOCUMENTS

| | | |
|---|---|---|
| DE | 1504052 | 2/1970 |
| DE | 3540078 | 11/1986 |
| FR | 2310889 | 12/1976 |
| GB | 1119193 | 7/1968 |

\* cited by examiner

*Primary Examiner*—Deborah Jones
*Assistant Examiner*—Abraham Bahta
(74) *Attorney, Agent, or Firm*—Ostrolenk, Faber, Gerb & Soffen, LLP

(57) ABSTRACT

A visually decorative material having bulk decorative effects which may be used as a surface covering or for creating decorative objects, and the method of manufacturing same. The material is formed of a pigmented castable liquid vehicle having dispersed therein a quantity of discrete particles of higher specific gravity than the liquid vehicle. The material is formed by pouring the vehicle-particle composite onto a suitable backing. As the liquid flows onto the backing, the particles sink and disturb the uniformity of the pigment distribution. This causes the desired bulk decorative effects in the form of "comet-tails" and other dimensionally extended streaks and curves. Thereafter, a second casting is applied using a formulation which is at an earlier stage of curing. The backing may be removed after the castable liquids solidify or may be left in place to create a laminate. As a floor-covering, the material may be poured in place onto a suitable sub-flooring. A protective surface coating may also be applied to the solidified casting.

22 Claims, No Drawings

COMPOSITE MATERIALS WITH BULK DECORATIVE FEATURES AND PROCESS FOR PRODUCING SAME

This application is a continuation-in-part of U.S. application Ser. No. 09/276,996, filed Mar. 26, 1999 abandoned.

FIELD OF THE INVENTION

The present invention relates to composite materials with visible bulk decorative features within the body of the material, and to methods for producing such materials in sheet or block form. Such materials are useful as surface coverings for walls, floors, furniture etc. and as materials for making jewelry or other decorative objects. Broadly speaking, such materials are formed of castable pigmented liquids and solid particles specifically chosen to interact mechanically with the pigments to produce bulk decorative effects in extended forms such as streaks, comet-tails, waves, curves, etc.

DESCRIPTION OF THE PRIOR ART

Various methods for producing decorative materials which can be formed as laminates and used as surface coverings or from which decorative objects can be produced are well-known.

For example, decorative laminates formed of sheet material of a resinous polymer composition, e.g. polyvinyl chloride, on a suitable substrate, e.g. a fibrous backing sheet, have been used for many years as sheet flooring. Similarly, laminates with simulated wood-grain or marbleized surfaces are used to produce furniture which is attractive and durable but inexpensive compared to natural materials.

Methods for producing such materials include mechanical embossing, chemical embossing or inlaying to provide contrasting surface finishes and other decorative effects.

Another type of decorative composite material consists of a transparent binder with embedded particles of various types. In these, the particles themselves provide decorative bulk effects and/or other functionality. Patents covering such materials include U.S. Pat. No. 3,941,607 to Schuhbauer which discloses a high traffic surface layer having chip grains, bituminous binder, and a high viscosity mortar; U.S. Pat. No. 3,950,581 to Maurin which shows a prefabricated tile panel having asbestos coated PVC chips; U.S. Pat. No. 4,126,727 to Kaminski covering a resinous polymer sheet containing mica, and transparent or translucent PVC chips; U.S. Pat. No. 4,257,834 to Iida which teaches a process for producing floor or wall sheet having a "chip like" pattern wherein the chips can be resin (PVC), inorganic, ceramic, metallic, stone, and wooden together with an epoxy or urethane resin; U.S. Pat. No. 4,530,856 to Kauffman which is directed to a floor covering laminate having a textured and glossy finish, wherein various types of PVC resin particles are used.

To the extent these patents are concerned with decorative effects, however, such effects are achieved from the appearance of the embedded particles themselves. So far as applicants have been able to determine, the prior art does not disclose materials or processes for manufacturing materials in which bulk decorative effects are achieved in continuous or extended form such as streaks, waves, curves, etc. through mechanical interaction between the constituents.

SUMMARY AND OBJECTS OF THE INVENTION

Broadly stated, decorative materials produced in accordance with this invention are comprised of a castable, pigmented liquid vehicle and a quantity of dispersable particles having a high specific gravity relative to the liquid vehicle, and a second castable liquid vehicle. The manufacturing process itself can be quite simple: after the first liquid and particles are thoroughly blended, the material is poured onto a suitable surface and allowed to begin to set. Then the second vehicle is applied in a desired pattern and the two vehicles allowed to set. The thickness of the casting can be adjusted mechanically and the surface textured or smoothed as desired. The first liquid can be poured onto a backing material if desired to produce a laminate, and a protective coating can be added after the composite has set and/or hardened.

As the first liquid is poured or cast, the included particles tend to float then sink due to the difference in specific gravity. The flow of the liquid is thus interrupted both vertically and horizontally by the movement of the particles, and the resulting non-uniformity of the dispersal of the pigment produces characteristic streaks, whirls, comet-tails and other extended bulk decorative effects.

Among the liquids which may be used are resinous polymers such as epoxy, PVC plastisols, acrylics, urethanes and the like, or other castable liquids such as glass. Any compatible colorant materials which have suitable light refracting properties may be used. A wide range of particle materials may be used, subject the various requirements discussed in detail below. Such materials include chips or flakes formed of PVC, acrylic, urea or polyester etc., or natural materials such as mica, quartz, sand or metal.

The process according to this invention makes available a new class of decorative materials for use as floor and wall coverings, laminated surfaces for furniture and even artists materials. Additionally, these materials can be produced easily and inexpensively in continuous sheet form or as discrete blocks or other desired shapes.

It is accordingly a general object of this invention to provide a new class of decorative materials and methods of manufacturing such materials.

More particularly, it is an object of this invention to provide materials having dimensionally extended bulk decorative effects which may be as floor and wall coverings, as surfaces for furniture and for a variety of other decorative purposes.

A related object of the invention is to provide a convenient and cost effective process for manufacturing the materials of this invention.

Another object of the invention is to provide decorative materials having bulk decorative effects in the form of extended streaks, comet-tails, waves or other curves and the like.

A further object of the invention is to provide decorative materials comprised of a castable pigmented liquid vehicle and a quantity of dispersable particles having a high specific gravity relative to the liquid vehicle, and a second vehicle, as well as a method of manufacturing such materials.

A related object is provide decorative materials having bulk decorative effects which are achieved by mechanical interaction between a pigmented castable liquid vehicle and dispersed particles contained therein as the liquid is cast and cures and/or hardens.

A further related object is to provide such materials and the process for manufacturing same in which the decorative effects are in the form of extended streaks, comet-tails, waves or other curves and the like.

Yet another object of the invention is to provide decorative materials and methods for manufacturing the same in which the materials are comprised of a castable pigmented liquid vehicle and included particulate material, and in which the decorative effects are achieved by proper selection of the properties of the liquid vehicle and the particulate material relative to each other.

Other objects, advantages and novel features of the invention will become readily apparent to those skilled in the art from the following drawings and detailed description of a preferred embodiment of the invention.

DETAILED DESCRIPTION OF THE INVENTION

The first material according to this invention is comprised of a castable pigmented liquid and solid particles which interact mechanically with the pigmented liquid to produce the desired decorative effects. This is described in application Ser. No. 09/276,996, filed Mar. 26, 1999, which is hereby incorporated herein by reference.

In accordance with several preferred embodiments of the invention, suitable liquids include resinous polymers such as epoxies, PVC plastisols, acrylics, urethanes and the like. Other non-resinous castable liquids such as glass may also be used.

Any colorant materials which are compatible with the liquid vehicle and have suitable light refracting properties may be used. For resinous vehicles, preferred colorants include mica-based pigments such as Mearl Hilite Pearl manufactured by Engelhard Corporation of Iselin, N.J. or metallic pigments such as manufactured by Silberline Manufacturing Co., Inc. of Tamaqua, Pa.

A wide range of particulate materials may be used, subject to several specific requirements. A first of these is that the particles not be reactive or soluble in the liquid vehicle so that the particles maintain their discrete shape during the pouring and setting stages of the process. Similarly for a liquid vehicle such as glass which is cast at an elevated temperature, the particles must not be affected by the heat. Further, because the particles must briefly remain suspended in the liquid and then sink as the liquid flows, the specific gravity of the particles is an important factor. Related to this is the viscosity of the liquid vehicle. Particle size is also important in achieving the desired visual effects.

Suitable materials include chips or flakes formed of PVC, acrylic, urea or polyester etc., or natural materials such as mica, quartz, sand or metal, the latter being especially preferred when the liquid vehicle is molten glass. Good results have been achieved using particles having specific gravities in the range of about 0.8 to about 3. Particle sizes in the range of about 5 cm to about 400 mesh size may be employed, with a preferred range of about 40 up to about 16 mesh size. Generally, the volume of particulates should not exceed about 75% of the composite material. Liquid vehicle viscosities ranging from about 10 to about 148,000 centipoises are suitable, with best results being achieved with viscosities in the range of about 700 to about 1000 centipoises.

When a vehicle having a relatively high viscosity is used, the specific gravity of the particles should also be correspondingly higher for a given particle size to achieve more pronounced decorative effects. Particle size may also be increased to compensate for higher liquid viscosity but the corresponding patterns and the surface texture of the product will appear to be coarser.

The manufacturing process itself can be a simple, manual process, or can be automated in various ways which will be obvious to one skilled in the art from the present description.

For example, the components of the resin system, the colorant and the particles are mixed together, with the order in which the constituents are added to the mixture depending on the particular resin system used. Blending is preferably done using a hand mixer, but a power mixer may also be used if it is of a type which does not cause introduction of a significant volume of air into the mixture. The mixture is then pre-cured if necessary and poured onto the desired substrate. To create floor tiles, wall covering panels or laminates for use in furniture manufacture, backing materials such as wood, is fiberboard, or the like are preferred. For other applications, ceramics, metal or other materials may also be used. A suitable mold may be used to achieve the desired shape or the mixture may be poured without a mold and the edges finished after the resin has hardened. Alternatively, as a floor covering, the mixture may be poured in place directly on a concrete or plywood sub-flooring. The desired product thickness and surface appearance may be achieved using a roller or other suitable tool. To produce a starting material for use in making jewelry or other decorative objects, the pigmented vehicle-particulate mixture can be cast onto a glass substrate or onto a non-stick backing such a polyethylene, which may be removed after the resin has hardened.

When the first layer is partially cured, a second layer is applied thereto in a desired pattern. The second layer is composed of a castable liquid vehicle which may or may not be pigmented, depending on the desired appearance, and may or may not contain dispersable particles. Thus, the second vehicle may be a quantity of the first vehicle which is at a different stage of curing. Preferable, the second vehicle is pigmented but does not contain the particles.

As the first layer cures, there is a period of time during which there will be resistance to substantial mixing and/or substantial spreading of the second vehicle such that the second vehicle will essentially remain at the position it is applied. During this period of time, the first liquid vehicle will still be sufficiently uncured such that it will allow the second liquid to both sink into its depth and spread out somewhat laterally while at the same time allowing the two liquids to form a single level layer, all the while remaining substantially distinct entities. In other words, the two formulations interact to self-level the resulting coating. This state or period of time is hereinafter referred to as the semi-cured self-leveling cure state or time. The semi-cured self-leveling cure time differs for each particular combination of liquids, pigments, particles and curing conditions but can readily be ascertained by a few routine test preparations.

One manner of operating is to prepare the two casing compositions at different points in time and allow both to cure under the same conditions. For example, one composition is prepared by mixing the vehicle, pigment and particles and then cast. After about an hour, preparation of the second vehicle is begun and 15 minutes later, it is applied to the surface of the first layer. Since the two materials are at a different points in their curing process, there is incomplete mixing. The curing of both then proceeds until complete. Alternatively, the two formulations can be prepared simultaneously. The first is cast and the curing of the resulting layer is accelerated by application of heat while the other formulation is maintained under ambient conditions. As a result, the extent of cure at any given time of one formulation is different from that of the other formulation. When the first layer is at the semi-cured self-leveling cure stage, the second formulation is applied and the resulting composite cured.

Once the composite has cured or hardened, a surface layer may be added to provide a smoother or more lustrous finish.

The surface layer may be formed of any suitable material such as a urethane or polyester, if a harder, more protective surface is desired. This may be done using any suitable or conventional technique. Urethane coatings having a thicknesses in the range of about 1 to about 15 mils, or polyester coatings having a thicknesses in the range of about 1 to about 20 mils are preferred.

Further details concerning typical and preferred manufacturing processes, constituents and material characteristics may be found in the following illustrative examples, but it should be appreciated that these are intended to be illustrative only, and that the scope of the invention is to be measured by the appended claims.

EXAMPLE 1

For an epoxy based product, a composite material was created as follows:

| CONSTITUENT | QUANTITY (Per Square Foot of Product) |
|---|---|
| Resin (Dow 325) | 89.2 gm. |
| Hardener (Eastech Agent M) | 44.0 gm. |
| Pigment (Silberline 554YG) | 1.0 gm. |
| PVC Chips (18 mesh, sp. grav. 1.3) | 2.4 gm. |

The resin, pigment and chips were thoroughly blended with a hand mixer, and then the hardener is added. After further blending, the mixture is allowed to cure briefly to achieve a viscosity of between 700 and 1000 centipoises, as measured by using a Brookfield LV type viscometer, no. 3 spindle at 12 RPM (about two minutes). The material was poured onto a wood panel as a substrate, and nap rolled to a thickness of 50 to 55 mils per sq. foot. As the liquid flowed relative to the sinking particles, the uniformity of the pigment was disturbed, and marbleized "comet-tails" and other extended decorative effects were created. The effects were three dimensional due to the refractive properties of the pigment, and the apparent texture of the design varied with the angle at which the surface was viewed.

One hour later, the same resin and pigment are thoroughly blended with a hand mixer, and then the same hardener is added. After further blending, the mixture is allowed to cure briefly to achieve a viscosity of between 700 and 1000 centipoises, as measured by using a Brookfield LV type viscometer, no. 3 spindle at 12 RPM (about two minutes). Then the second formulation is applied to the surface of the first layer in a symmetrical pattern and the resulting composite is allowed to cure. It is observed that the edges of the second formulation diffuse laterally somewhat and the two formulations rearrange themselves to form a single level surface. After the resins are completely cured, the material is cut to produce finished straight edges.

EXAMPLE 2

The process of Example 1 is repeated, but after the composite has cured, a urethane coating having a thickness of 10 mils is added. A smoother, more lustrous surface results.

EXAMPLE 3

The process of Example 1 is again repeated, but using PVC chips of 40 mesh size in the first formulation. The result is essentially similar except that the visual effects are smaller and the surface is smoother.

EXAMPLE 4

The process of Example 1 is again repeated, but substituting a contrasting pigment, namely specify, in the second formulation. The result is similar except that the symmetrical pattern has a different color.

EXAMPLE 5

For a PVC plastisol based product, composite materials were created as follows:

| CONSTITUENT | QUANTITY (Per Square Foot of Product) |
|---|---|
| Dispersion Resin (Borden 1071) | 100 parts |
| Plasticizer (Butyl Benzyl Phthalate) | 50 parts |
| Epoxidized Soybean Oil | 5 parts |
| Stabilizer (Therm Check SP-1363) | 3.5 parts |
| Stabilizer (Therm Check 5526) | 1 part |
| Diluent (Aromatic 150) | 5.5 to 50 parts |
| Pigment (Mearl Hilite Pearl No. 9120C) | 5–10 parts |
| PVC Chips (18 mesh, sp. grav. 1.3) | 10–20 parts |

The constituents were blended using a hand mixer, and the viscosity was adjusted to between 700 and 1000 centipoises, as measured by using a Brookfield LV type viscometer, no. 3 spindle at 12 RPM, by adding diluent. The mixture was poured and rolled to a thickness of 50 to 55 mils per sq. foot as in Example 1.

One hour later, another preparation of the same formulation but without the particulate is prepared and allowed to cure briefly to achieve a viscosity of between 700 and 1000 centipoises, as measured by using a Brookfield LV type viscometer, no. 3 spindle at 12 RPM (about two minutes). Then the second formulation is applied to the surface of the first layer in a symmetrical pattern and the resulting composite is allowed to cure. It is observed that the edges of the second formulation diffuse laterally somewhat and the two formulations rearrange themselves to form a level surface. After the resin is completely cured, the material is cut to produce finished straight edges. Similar results to that in the other examples are achieved, with the visual effects being more closely spaced because of the higher chip concentration.

EXAMPLE 6

The process of Example 5 is repeated using PVC particles of 40 mesh size and various chip concentrations. The results are similar to those in Example 5.

EXAMPLE 7

The process of Example 5 is repeated except that the particles were not omitted from the second formulation when the second preparation is made.

Various changes and modifications can be made to the foregoing invention without departing from the spirit and scope there. The embodiments set forth above were for the purpose of illustration only and were not intended to limit the invention.

What is claimed is:

1. A decorative composite material having bulk decorative effects and formed as a casting, the material comprising:
   a substantially transparent solidified first castable liquid having a first colorant and a quantity of dispersed particles therein, wherein a specific gravity of the dispersed particles relative to the viscosity of the first castable liquid is such that the dispersed particles sink as the liquid flows before becoming solidified, to form three dimensional extended non-uniformities in the dispersion of the first colorant visible in the body of the material; and a second solidified castable liquid disposed in a pattern on the first castable liquid, whereby a first surface of the casting is substantially level.

2. A decorative composite material as claimed in claim 1, in which the second solidified castable liquid comprises a colorant.

3. A decorative composite material as claimed in claim 2, in which the particles have a specific gravity in the range of about 0.8 and about 3 and have a size in the range of about 5 cm to about 400 mesh, and in which each of the first and second solidified castable liquids are individually selected from the group consisting of glass, an epoxy, an acrylic, a PVC plastisol, a polyester and a urethane.

4. A decorative composite material as claimed in claim 3, further including a surface coating comprised of a resinous polymer.

5. A decorative composite material as claimed in claim 1, wherein the casting has a second surface affixed to a substrate, and wherein the second surface is opposite the first surface.

6. A decorative composite material as claimed in claim 1, in which the particles have a specific gravity in the range of about 0.8 and about 3 and have a size in the range of about 5 cm to about 400 mesh, and in which each of the first and second solidified castable liquid is individually selected from the group consisting of glass, an epoxy, an acrylic, a PVC plastisol, a polyester and a urethane.

7. A decorative composite material as claimed in claim 1, further including a surface coating comprised of a resinous polymer.

8. A decorative composite material as claimed in claim 7, wherein the casting has a second surface affixed to a substrate, and wherein the second surface is opposite the first surface.

9. A decorative composite material as claimed in claim 1, wherein the casting has a second surface affixed to a substrate, and wherein the second surface is opposite the first surface.

10. A decorative composite material as claimed in claim 1, in which the non-uniformities in the dispersion of colorant are in the shape of comet tails.

11. A decorative composite material as claimed in claim 1, in which the particles have a specific gravity in the range of about 0.8 and about 3.

12. A decorative composite material as claimed in claim 1, in which the particles have a size in the range of about 5 cm to about 400 mesh.

13. A decorative composite material as claimed in claim 1, in which each of the first and second solidified castable liquid is individually selected from the group consisting of glass, an epoxy, an acrylic, a PVC plastisol, a polyester and a urethane.

14. A decorative composite material as claimed in claim 1, in which the particles comprise between about 5% and about 20% of the material by weight.

15. A decorative composite material having bulk decorative effects and formed as a casting, the material comprising:

a substantially transparent solidified first castable liquid having a first colorant and a quantity of dispersed particles therein, wherein a specific gravity of the dispersed particles relative to the viscosity of the first castable liquid is such that the relative movement of the dispersed particles and the liquid as it flows before becoming solidified, forms three dimensional extended non-uniformities in the dispersion of the first colorant visible in the body of the material; and a second solidified castable liquid disposed in a pattern on the first castable liquid, whereby a first surface of the casting is substantially level.

16. A decorative composite material having bulk decorative effects and formed as a casting, the material comprising:

a substantially transparent solidified first castable liquid having a first colorant and a quantity of dispersed particles therein, wherein three dimensional extended non-uniformities in the dispersion of the first colorant are visible in the body of the material; and a second solidified castable liquid disposed in a pattern on the first castable liquid, whereby a first surface of the casting is substantially level.

17. A decorative composite material as claimed in claim 16, further including a surface coating comprised of a resinous polymer.

18. A decorative composite material as claimed in claim 16, wherein the casting has a second surface affixed to a substrate, and wherein the second surface is opposite the first surface.

19. A decorative composite material as claimed in claim 16, in which the particles have a specific gravity in the range of about 0.8 and about 3.

20. A decorative composite material as claimed in claim 16, in which the particles have a size in the range of about 5 cm to about 400 mesh.

21. A decorative composite material as claimed in claim 16, in which each of the first and second solidified castable liquid is individually selected from the group consisting of glass, an epoxy, an acrylic, a PVC plastisol, a polyester and a urethane.

22. A decorative composite material as claimed in claim 16 in which the particles comprise between about 5% and about 20% of the material by weight.

* * * * *

UNITED STATES PATENT AND TRADEMARK OFFICE
CERTIFICATE OF CORRECTION

PATENT NO. : 6,649,257 B1
DATED : November 18, 2003
INVENTOR(S) : Richard Satz

It is certified that error appears in the above-identified patent and that said Letters Patent is hereby corrected as shown below:

<u>Title page,</u>
Item [63], Related U.S. Application Data, should read:
-- Continuation-in-part of application No. 09/276,996, filed on Mar. 26, 1999, now U.S. Patent No. 6,607,818 B1 --.

Signed and Sealed this

Twentieth Day of April, 2004

JON W. DUDAS
*Acting Director of the United States Patent and Trademark Office*